(12) United States Patent
Prasanna

(10) Patent No.: US 6,317,874 B1
(45) Date of Patent: Nov. 13, 2001

(54) LINKER METHOD AND CACHE STRUCTURE FOR MINIMIZING WORST-CASE-EXECUTION-TIME

(75) Inventor: G. N. Srinivasa Prasanna, Clinton, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/205,198

(22) Filed: Dec. 4, 1998

(51) Int. Cl.$^7$ .................................................. G06F 9/45
(52) U.S. Cl. ................................................................ 717/9
(58) Field of Search ........................... 717/9, 10; 711/113

(56) References Cited

U.S. PATENT DOCUMENTS 5,579,520 11/1996 Bennett .
6,157,981 * 12/2000 Blaner et al. ............................. 711/3

OTHER PUBLICATIONS

Ye. Embedded Program Timing Analysis Based on Path Clustering and Architecture Classification. IEEE. pp. 598–604, Sep. 1997.*
Mataix et al. Adding Instruction Cache Effect to Schedulability Analysis of Preemptive Real–Time Systems. IEEE. pp. 204–212, Feb. 1996.*
Zhang. Worst Case Timing Analysis For Real–Time programs. IEEE. pp. 960–963, Mar. 1997.*
Kim et al. Efficient Worst Case Timing Analysis of Data Caching. IEEE. pp. 230–240, Feb. 1996.*
Li et al, "Cache Modeling for Real–Time Software: Beyond Direct Mapped Instruction Caches," in Proceedings of the IEEE Real–Time Systems Symposium, Dec. 1996.

* cited by examiner

Primary Examiner—Mark R. Powell
Assistant Examiner—Wei Zhen
(74) Attorney, Agent, or Firm—Dickstein Shapiro Morin & Oshinsky LLP

(57) ABSTRACT

A unique cache structure with some addressing flexibility and a unique linker method that generates program code with a minimized WCET and takes advantage of the flexibility of the cache structure is provided. The method generates relocatable object modules for each function of the program code. Suitable starting locations for theses objects modules are generated and linked together forming an executable version of the program code. WCET analysis is performed on the executable code. The WCET is then compared to the previous best WCET estimate. The starting locations of the modules providing the better WCET are stored as the best configuration for the program code. The process may be repeated until the WCET is suitably minimized. The unique cache structure allows the WCET minimized program code to reside contiguously in memory, while being properly cached according to the results of the linker method. The cache structure dynamically offsets the different object modules into the instruction cache at runtime as per the results of the linker method. That is, it introduces code gaps in a dynamic manner. A unique cache program counter is used to expeditiously predict and generate the next instruction cache address. As such, the WCET of a program can be minimized and incorporated into an architecture with an instruction cache in an inexpensive manner and without wasting system resources.

21 Claims, 4 Drawing Sheets

LINKER METHOD AND CACHE STRUCTURE FOR MINIMIZING WORST-CASE-EXECUTION-TIME

BACKGROUND OF THE INVENTION

1. Field of the Invention

The present invention relates to the field of computers and, more particularly to a linker method and cache structure for minimizing worst-case-execution-time (WCET) of a computer program for computer architectures utilizing an instruction cache.

2. Description of the Related Art

The execution time of a computer program will vary depending on numerous factors such as, for example, the system hardware the program is running on, the amount of program inputs and outputs and the efficiency of the program code itself. Often times, it is desirable to determine the execution time of a program running on a particular computer system prior to its incorporation into an end product or system. In real-time applications, for example, it is essential to determine a program's worst-case-execution-time (WCET) to ascertain whether the program will meet predetermined timing deadlines and other system performance requirements. The WCET is an estimation of the worst possible execution time for the program and the system it is running on. Once determined, the WCET will indicate to system engineers whether hardware, software or other system changes are needed in order to satisfy system requirements.

One potential way to improve the WCET of a program is to incorporate cache memory, particularly an instruction cache, into the system architecture. This method, however, is rarely used due to the unpredictable nature of caches. A party required to give a WCET guarantee will not use an instruction cache due to this unpredictability. It, however, remains desirable to use an instruction cache to minimize WCET.

Typically, cache memory resides on-chip with the main processor of the system architecture while the memory containing the program instructions resides off-chip. As is known in the art, an executing program's performance is greatly enhanced by placing blocks of program instructions that are to be executed into an instruction cache as opposed to individually and continuously accessing the system's memory to retrieve the instructions. Thus, the use of an instruction cache avoids time consuming memory accesses associated with the retrieval of program instructions since the instructions are already loaded into the processor's cache.

Recently developed tools, such as Princeton University's CINDERELLA, exist for estimating the WCET of a program running on a system having an instruction cache. The execution time of a cached instruction is dependent upon whether the instruction results in a cache hit (i.e., found within the cache) or miss (i.e., not found within the cache) when the processor attempts to execute the instruction. A cache miss generally results from an address conflict within the cache (i.e., the cache address of the instruction was overwritten by another instruction having the same cache address). Upon a cache miss, the processor must retrieve the instruction from main memory and thus, the execution of the instruction takes a longer period of time. This tool performs a dataflow analysis of the program code and generate an integer-linear-programming problem (ILP) for that code. The ILP models the addressing of the cache to determine conflicts that would result in cache misses. This tool determines the WCET by providing a solution for the ILP. A description of such a tool is found in Li et al, "Cache Modeling for Real-time Software: Beyond Direct Mapped Instruction Caches," in Proceeding of the IEEE Real-Time Systems Symposium, December 1996. It is desirable, however, to use these methods to improve the design of an instruction cache to suitably minimize WCET.

Typically, a program is divided into numerous modules called "functions." Functions are groupings of program instructions that perform a specific task or tasks. A program will typically include a "main module" that initiates function calls to perform the tasks of the program. It is well known that splitting a program into individual functions enhances the ability to create, debug and operate the program.

Generally, having all program code in one long contiguous region of memory does not minimize cache conflicts, particularly when numerous individual program functions are involved. FIG. 1a illustrates the situation where a top level function F0 calls a second function F1 which in turn calls a third function F2. Depending upon the address locations of these functions F0, F1, F2, they can all be mapped to the same cache lines causing the second function F1 to thrash out the first function F0 upon its entry into the cache. That is, depending upon the location of the functions F0, F1, F2 in main memory, it is possible that the functions F0, F1, F2 will be placed into the same locations of the cache, causing one function, F1 for example, to overwrite another function, F0, for example, even though the function F1 will return to function F0. When the second function F1 returns, the cache will no longer hold any instructions from the first function F0, resulting in excess cache misses and a large WCET for the program.

It has been determined that relocating program functions F0, F1, F2 in memory could result in better cache mapping and accordingly, better WCET for the program. FIG. 1b illustrates how the three functions F0, F1, F2 can be placed into non-contiguous memory by placing code gaps between them and possibly permuting the order of the functions F0, F1, F2 (in general, code gaps can do anything that permuting the order of the functions can do and more). This would improve the caching of these functions since they would not be mapped into the same cache lines (as they would in the contiguous placement illustrated in FIG. 1a). Although this may provide better cache mapping, it would lead to severe memory wastage requiring the system to have much more memory than necessary and thus, increasing the size and cost of the system. Accordingly, there is a need and desire to minimize the WCET of a program running on a system architecture utilizing an instruction cache inexpensively and without wasting system resources.

SUMMARY OF THE INVENTION

The present invention minimizes the WCET of a program running on a system architecture utilizing an instruction cache in an inexpensive manner and without wasting system resources.

The above and other features and advantages of the invention are achieved by providing a unique cache instruction structure with some addressing flexibility and a unique linker method that generates program code with a minimized WCET and takes advantage of the flexibility of the cache structure. The method generates relocatable object modules for each function of the program code. Suitable starting locations for these object modules are generated and linked together forming an executable version of the program code. WCET analysis is performed on the executable code. The WCET is then compared to the previous best WCET estimate. The starting locations of the modules providing the better WCET are stored as the best configuration for the program code. The process may be repeated until the WCET is suitably minimized. The unique cache structure allows the WCET minimized program code to reside contiguously in memory, while being properly cached according to the results of the linker method. The cache structure dynamically offsets the different object modules into the instruction cache at run-time as per the results of the linker method. That is, it introduces code gaps in a dynamic manner. A unique cache program counter is used to expeditiously predict and generate the next instruction cache address. As such, the WCET of a program can be minimized and incorporated into an architecture with an instruction cache in an inexpensive manner and without wasting system resources.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

Figure 1A:
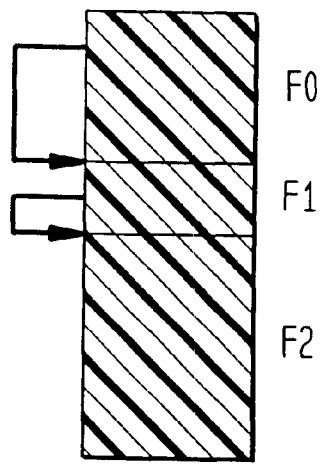
FIG. 1a illustrates functions of a program code residing contiguously in memory.
Figure 1B:
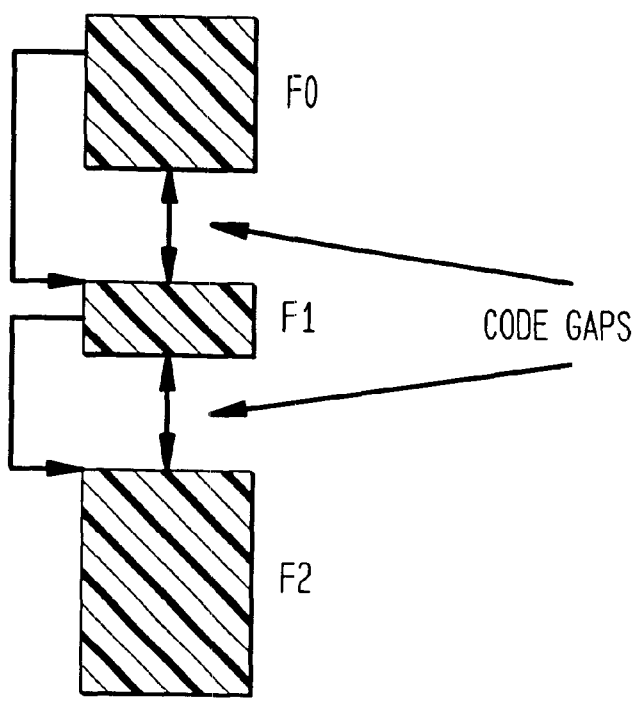
FIG. 1b illustrates functions of a program code residing non-contiguously in memory.
Figure 2:
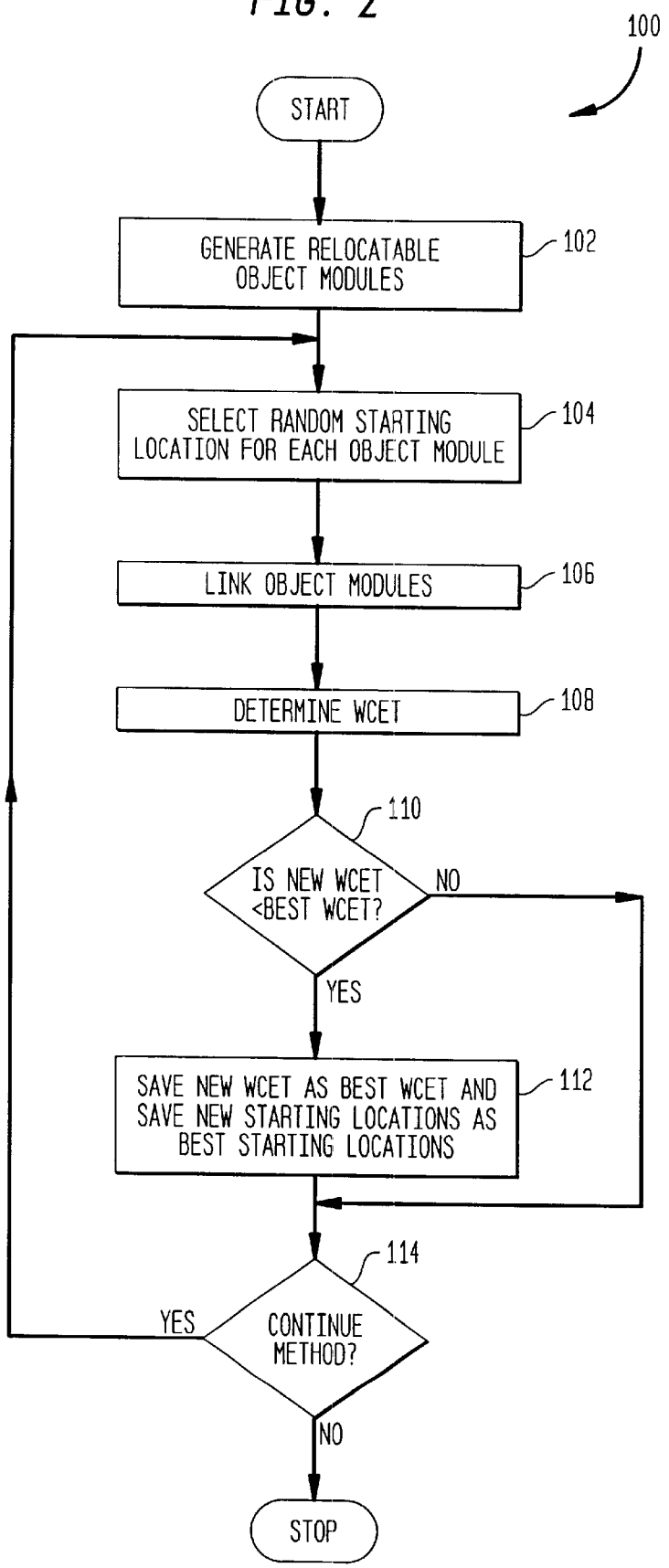
FIG. 2 illustrates a linker method in accordance with a preferred embodiment of the present invention.

FIG. 2 illustrates a linker method 100 in accordance with a preferred embodiment of the present invention. Prior to describing the method, the following description is supplied to provide an understanding of some of the steps of the method 100.

As is known in the art, program code is typically written in either a high-level program language such as C or ADA which is processor independent or a machine-level program language which is processor dependent. Although the use of these programming languages allow a programmer to develop software quickly in languages suitable for humans, they are typically unrecognizable by a computer.

The software as written by a programmer, often referred to as source code, must be converted into instructions recognizable by the computer processor. Typically, the source code is compiled into object modules using a "compiler" compatible for the processor on which the code is to be run (often referred to as the "target processor"). The object modules will include instructions specific for the target processor based upon the source code, but not in a form in which the processor can access directly. The object modules must then be linked together along with any necessary libraries or software tools to form an a executable or binary version of the program.

The linking of the object modules is performed by a "linker." Typically, the linker receives from an operator a list of object modules to be linked along with instructions on how to link the modules. The linker then links the object modules as instructed, performs necessary error checking and generates an executable version of the program code. It is this executable version that is download or stored into system memory and subsequently executed by the processor.

As is known in the art, it is possible to compile software into relocatable object modules. That is, the object modules will be created such that they can be reside at different starting addresses without adverse consequences.

Referring again to FIG. 2, the method 100 begins by generating relocatable object modules for every function of the program (step 102). The exact generation of these relocatable object modules is application specific and dependent upon the target processor and compiler used.

The method continues at step 104 where random starting addresses are selected for each of the object modules generated in step 102. The addresses can be selected by any method as long as the range of addresses used fit within the address space of the application system. The instructions can be located at the addresses by the linker and the object modules will be linked together accordingly (step 106). Upon successful completion of the linking step (step 106), an executable version of the program code will be created. Typically, an executable version will not be created if there were any errors in the linking step. Any errors would need to be corrected and the linking step would need to be redone.

In step 108, the method determines the WCET of the executable program. This step can be performed by any tool capable of determining the WCET of a program that is to be run on a system utilizing an instruction cache. If this is the first WCET calculated for the program it is stored as the best WCET. If this WCET is not the first WCET calculated for the program, it is compared to the best WCET in step 110. If the new WCET is less than the best WCET, then the new WCET is saved as the best WCET and the starting locations of the object modules are saved as the best starting locations (step 112) and the method continues at step 114. If the new WCET is not less than the best WCET, then the method proceeds to step 114. At step 114 it is determined if the method 100 has completed or should continue at step 104. This determination can be based on several factors, such as whether there are more possible random locations for the object modules or whether the best WCET has reached a desirable WCET. It must be noted that the use of random starting locations is but one method of choosing starting locations for the object modules and that any other method may be used to determine suitable starting locations for each object module.

Figure 3:
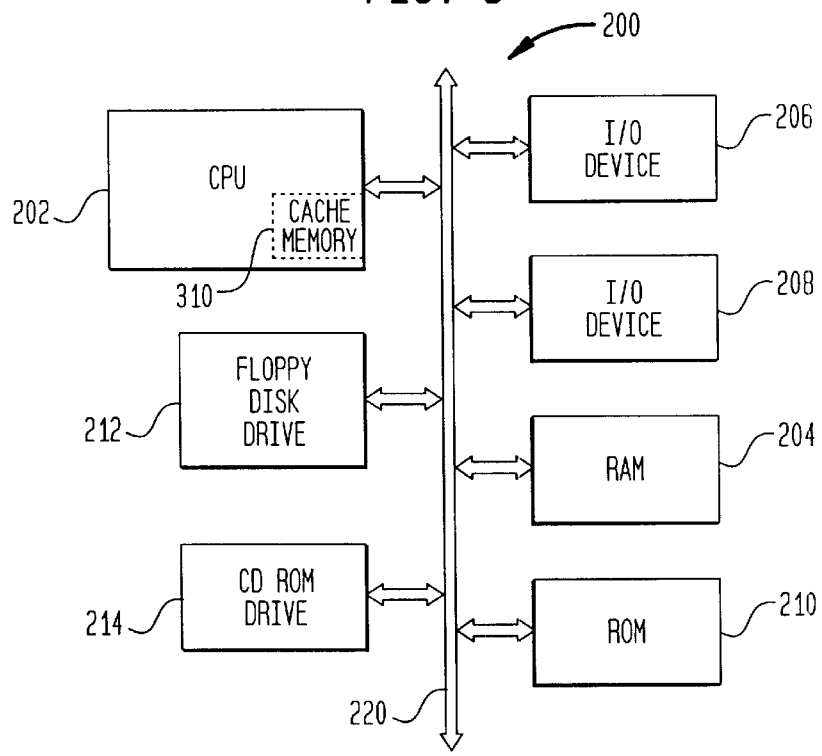
FIG. 3 illustrate a computer system in which the program code and cache structure of the present invention may be implemented.

FIG. 3 illustrates a computer system 200. This system can be used to perform the method 100 of the present invention (FIG. 2). The system 200 may also be used to run a WCET minimized program as generated by the method 100 of the present invention. As will be described below with reference to FIG. 5, the system 200 may also implement the cache structure of the present invention.

The system 200 includes a central processing unit (CPU) 202 that communicates to random access memory (RAM) 204 and an input/output (I/O) device 206 over a bus 220. A second I/O device 208 is illustrated, but is not necessary to practice the invention. The computer system 200 also includes read only memory (ROM) 210 and may include peripheral devices such as a floppy disk drive 212 and a compact disk (CD) drive 214 that also communicate with the CPU 202 over the bus 220 as is well known in the art. The CPU 202 includes or is coupled to a cache memory 310 to be used as an instruction cache constructed in accordance with the present invention (detailed in detail below with reference to FIG. 5).

The linker method 100 (FIG. 2) of the present invention has created an executable program with a minimized WCET. This executable program, however, will have some code gaps between the functions. As stated earlier, it is desirable to reduce the code gaps to prevent memory wastage. The present invention prevents memory wastage by placing the executable program contiguous in main memory, but dynamically offsetting the program's functions into the cache at run-time. The offsetting is performed according to the address relocations determined by the method 100 (steps 104 to 112).

Figure 4:
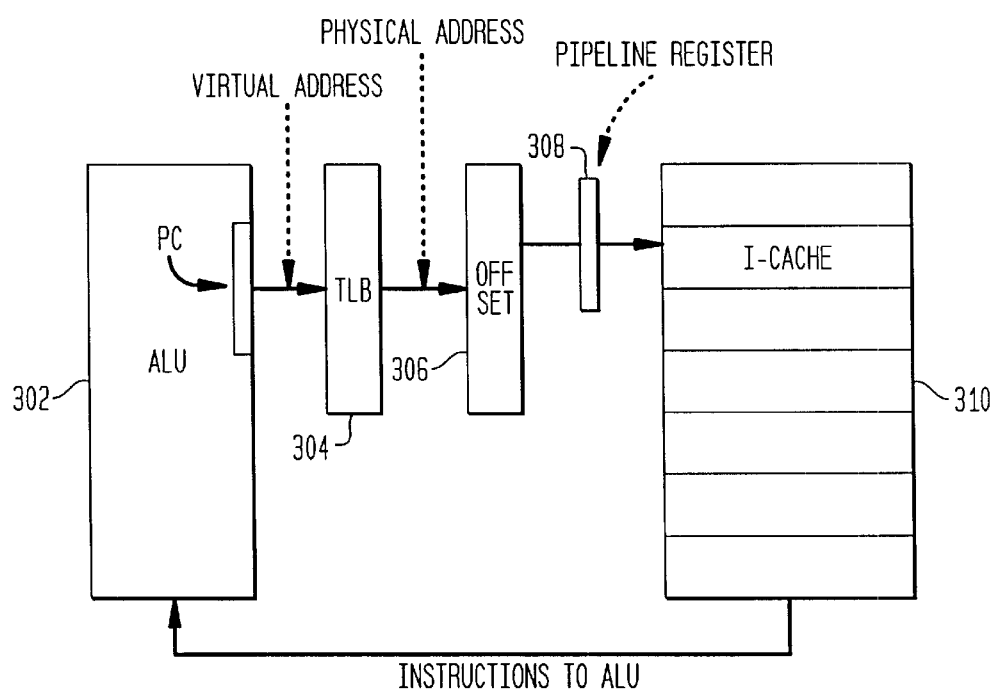
FIG. 4 illustrates an instruction cache with an offsetting scheme.

FIG. 4 illustrates an instruction cache structure 300 that could be used to perform the dynamic offsetting of the relocated object modules. The structure 300 includes a processor's arithmetic logic unit (ALU) 302, transition lookaside buffer (TLB) 304, offset address generator 306, pipeline register 308 and instruction cache memory 310. As is known in the art, a program counter (PC) provided on the ALU 302 supplies a virtual address of a program instruction to the TLB 304. The TLB 304 converts the address into a physical address. In order to implement the dynamic offsetting required by the present invention, the physical address is supplied to the offsetting address generator 306.

The offsetting address generator 306 would contain the offsets associated with the physical address of the individual functions so that the functions would be properly mapped into the instruction cache. The offsetting address generator 306 could be, for example, memory or some type of logic that looks at the physical address and generates the required offset. The physical address is used to determine which function is being executed and the appropriate offset is added to the physical address. This type of address generation impacts the cycle time of the processor and requires that the addresses be pipelined into the pipeline register 308 in order for the system to run faster. The pipelined address is then used to access the instruction cache memory 310. This process is repeated for every program counter instruction address. The structure 300, however, introduces time delays due to the address lookup and offset process and the use of a long pipeline register 308 and thus, is not an optimal cache structure for the minimized WCET program.

Figure 5:
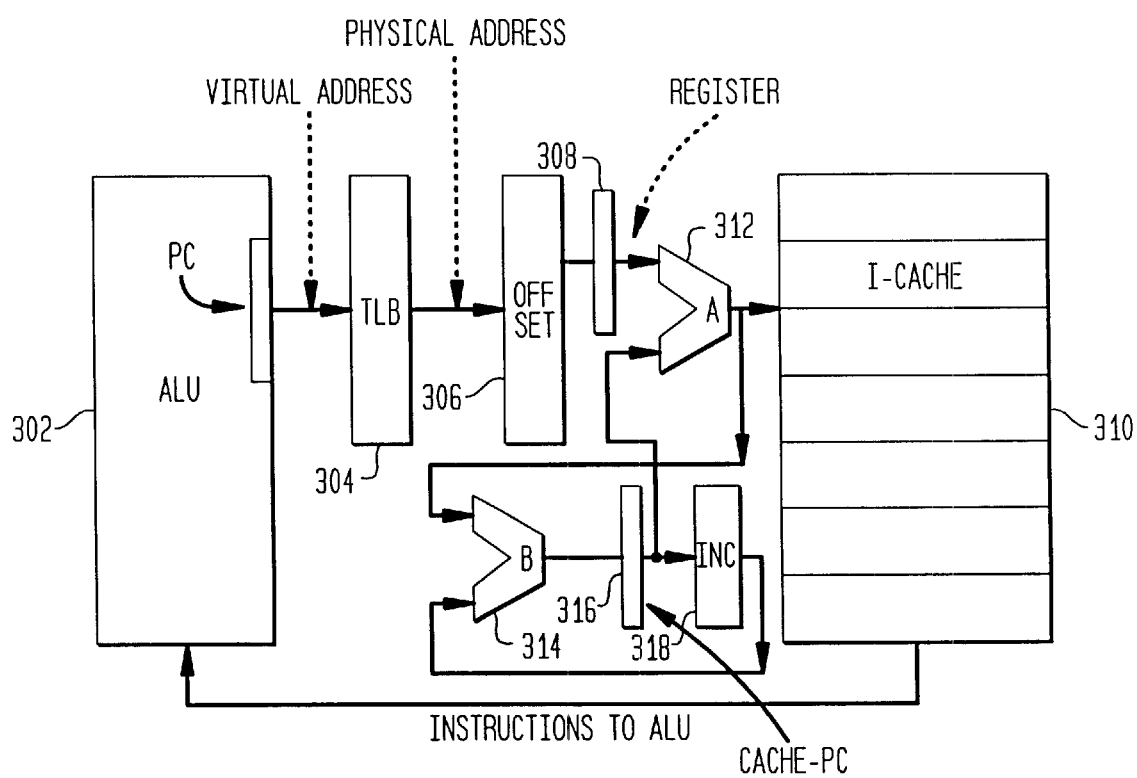
FIG. 5 illustrates an instruction cache and improved offsetting scheme constructed in accordance with a preferred embodiment of the present invention.

FIG. 5 illustrates an instruction cache structure 350 constructed in accordance with the present invention. The structure 350 utilizes a unique cache program counter (cache-pc) 315 to expeditiously predict and generate instruction cache addresses and thus, is an improved cache structure for the minimized WCET program. The structure 350 includes the cache-pc 316, an ALU 302 (with program counter PC), TLB 304, offset address generator 306, pipeline register 308, instruction cache memory 310, two multiplexers 312, 314 and an incrementor 318. The ALU 302, TLB 304, offset address generator 306 and the pipeline register 308 function as described above with reference to FIG. 4. The output of the pipeline register 308 is sent to the first multiplexer 312. The output of the first multiplexer 312 is used to address the instruction cache memory 310 and is also sent to the second multiplexer 314. The output of the second multiplexer 314 is fed thru the cache-pc 316 to the incrementor 318. The output of the incrementor 318 is input into the second multiplexer 314. The cache-pc 316 can be a pipeline register or latch suitable to store an instruction address. The output of the cache-pc 316 also goes to an input of the first multiplexer 312.

Generally, instructions are executed sequentially until either a program branch or function call is executed. Sequential instructions will have sequential addresses, while a branch or function call will lead to an instruction having a non-sequential address. In operation, the cache-pc 316 predicts the next instruction cache address on the premises that the flow of instructions will be sequential. That is, the cache-pc 316 is incremented by the incrementor 318 to generate the next sequential instruction address (this is performed by controlling the second multiplexer 314 to allow the output from the incrementor 318 to be output to the cache-pc 316). This address is applied to the first multiplexer 312 and will be used to access the cache memory 310 if the next instruction is not a branch or function call (i.e., it is a sequential instruction).

The cache-pc 316 is reloaded at each program branch or function call by passing the output of the first multiplexer 312 thru the second multiplexer 314 to the cache-pc 316. If the next instruction is not a branch, the first multiplexer 312 is controlled to allow the cache-pc 316 to access the cache memory 310. If the next instruction is a branch, the first multiplexer 312 is controlled to allow the output of the pipeline register 308 to access the instruction cache memory 310 while, simultaneously, the cache-pc 316 is loaded with the new address (by controlling the second multiplexer 314 to output the output of the pipeline register 308 to the cache-pc 316). Accordingly, the structure 350 does not have to generate a new physical address and then offset the address prior to accessing the cache memory 310 unless branch or function calls are executed. As such, this structure 350 avoids the delay, caused by the pipelined offset computation (between the offset address generator 306 and pipeline register 308).

It must be noted that the method 100 (illustrated in FIG. 2) can be modified to choose an acceptable WCET, and appropriate starting locations for the modules, even if the WCET is not the best it could be. There may be applications in which a WCET is good enough for the application and the method 100 will simply choose that WCET without ever looking for the best or most minimized WCET.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of minimizing the worst-case-execution-time (WCET) of a program to be executed on a processor, the program comprising source modules corresponding to different functions to be performed by the processor, said method comprising the steps of:

a) generating relocatable object modules from said source modules;

b) selecting starting locations for each of said object modules;

c) generating an executable version of said program from said object modules;

d) estimating a WCET of said executable version; and e) repeating steps b), c) and d) until a predetermined WCET condition is met.

2. The method according to claim 1 wherein said step of selecting starting locations for said object modules is performed by randomly selecting addresses for the starting locations.

3. The method according to claim 1 wherein the step of generating an executable version of said program is performed by linking said object modules such that each of said modules begins at its respective starting address.

4. The method according to claim 1 wherein said predetermined condition is a desirable WCET for said program.

5. The method according to claim 1 wherein said predetermined condition is a best WCET for said program and step d) further comprises the steps of:
   di) comparing said estimated WCET to a previously stored best WCET; and
   dii) storing said estimated WCET as a new best WCET if said estimated WCET has a lower score than said previously stored best WCET.

6. The method according to claim 1 wherein said step of estimating a WCET is performed by a software tool suitable for estimating a WCET for a program to be executed on a processor with an instruction cache.

7. A method of operating a processor executing a program with a minimized worst-case-execution-time (WCET), said processor including an instruction cache, said method comprising the steps of:
   storing said program in contiguous address locations of a first memory; and
   offsetting program instruction addresses of said stored executable version into instruction cache memory while said processor is executing by:
      generating an instruction cache memory address from an address of said first memory for the program instruction;
      providing a program counter for the cache memory;
      setting said program counter to said cache memory address; and
      accessing a location of said instruction cache memory corresponding to said program counter.

8. The method according to claim 7 further comprising the step of using said program counter to access a sequential location of said instruction cache memory when a next instruction has a sequential address.

9. The method according to claim 8 wherein said step of using said program counter to access a sequential location is performed by incrementing said program counter and using said incremented program counter to access a location of said cache memory.

10. The method according to claim 7 further comprising the step of accessing a non-sequential location of said cache memory when a next instruction has a non-sequential address.

11. The method according to claim 10 wherein said step of accessing a non-sequential location of said cache memory comprises the step of generating an instruction cache memory address from an address of said first memory for the non-sequential program instruction.

12. A computer system for minimizing the worst-case-execution-time (WCET) of a program to be executed on a processor, the program comprising source modules corresponding to different functions to be performed by the processor, said system comprising:
   means for generating relocatable object modules from said source modules;
   means for selecting starting locations for each of said object modules;
   means for generating an executable version of said program from said object modules;
   means for estimating a WCET of said executable version; and
   means for controlling said selecting means, said means for generating an executable version and said estimating means to repeatedly select starting locations for each of said object modules, generate a new executable version of said program and estimate a WCET of said new executable version until a predetermined WCET condition is met.

13. The system according to claim 12 wherein said means for selecting starting locations for said object modules randomly selects addresses for the starting locations.

14. The system according to claim 12 wherein said means for generating an executable version of said program includes linking said object modules such that each of said modules begins at its respective starting address.

15. The system according to claim 12 wherein said means for estimating a WCET is a software tool suitable for estimating a WCET for a program to be executed on a processor with an instruction cache.

16. A computer system for minimizing the worst-case-execution-time (WCET) of a program to be executed on a processor, the program comprising source modules corresponding to different functions to be performed by the processor, said system comprising:
   means for generating relocatable object modules from said source modules;
   means for selecting starting locations for each of said object modules;
   means for generating an executable version of said program from said object modules; and
   means for estimating a WCET of said executable version, wherein said means for estimating a WCET of said executable version comprises:
      means for comparing said estimated WCET to a previously stored best WCET; and
      means for storing said estimated WCET as a new best WCET if said estimated WCET has a lower score than said previously stored best WCET.

17. A computer system for executing a program with a minimized worst-case-execution-time (WCET), comprising:
   a processor, said processor including an instruction cache;
   a memory device, said program being stored in contiguous address locations of said memory device; and
   means for offsetting program instruction addresses of said stored executable version into instruction cache memory while said processor is executing, wherein said means for offsetting program instruction addresses comprises:
      means for generating an instruction cache memory address from an address of said memory device for the program instruction;
      means for providing a program counter for the instruction cache memory;
      means for setting said program counter to said instruction cache memory address; and
      means for accessing a location of said instruction cache memory corresponding to said program counter.

18. The system according to claim 17 further comprising means for using said program counter to access a sequential location of said instruction cache memory when a next instruction has a sequential address.

19. The system according to claim 18 wherein said means for using said program counter to access a sequential location includes means for incrementing said program counter and using said incremented program counter to access a location of said cache memory.

20. The system according to claim 17 further comprising means for accessing a non-sequential location of said cache memory when a next instruction has a non-sequential address.

21. The system according to claim 20 wherein said means for accessing a non-sequential location of said cache memory comprises means for generating an instruction cache memory address from an address of said first memory for the non-sequential program instruction.

* * * * *